J. R. DODGE, Jr.
FRUIT-DRIER.
No. 190,748. Patented May 15, 1877.
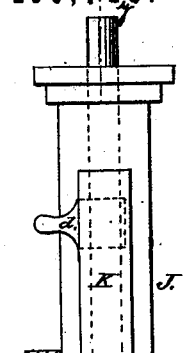
Fig. 1.
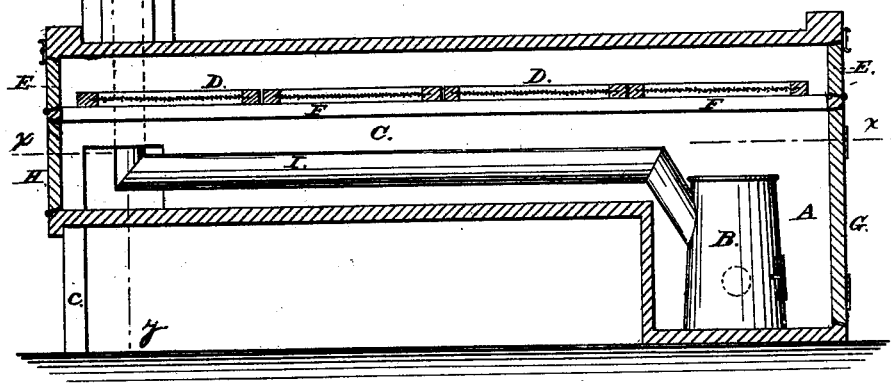
Fig. 2.
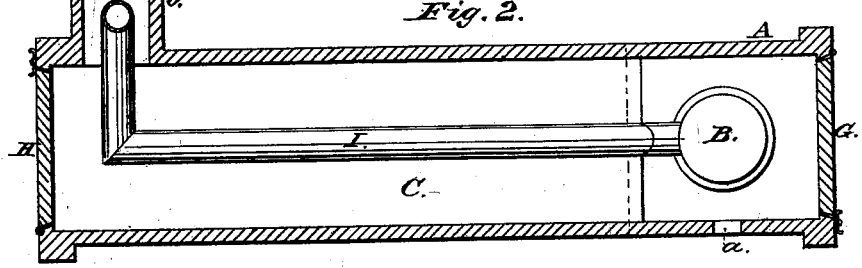
Fig. 3.
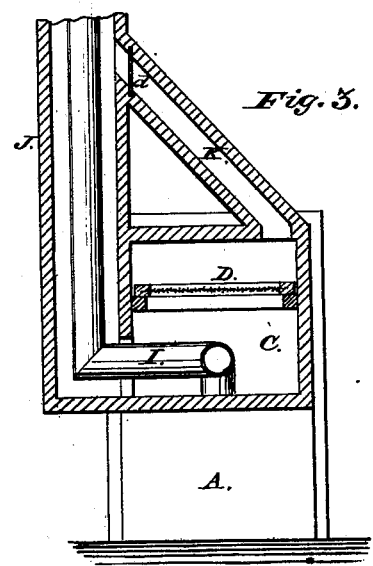
Witnesses:
Inventor:
John R. Dodge Jr.
by DeWitt C. Allen
atty.

UNITED STATES PATENT OFFICE.

JOHN R. DODGE, JR., OF NORMAL, ILLINOIS, ASSIGNOR OF ONE-HALF HIS RIGHT TO WILLIAM T. SHURTLEFF, OF SAME PLACE.

IMPROVEMENT IN FRUIT-DRIERS.

Specification forming part of Letters Patent No. 190,748, dated May 15, 1877; application filed April 16, 1877.

*To all whom it may concern:*

Be it known that I, JOHN R. DODGE, Jr., of Normal, in the county of McLean and State of Illinois, have invented certain new and useful Improvements in Driers; and I do hereby declare that the following is a full, clear, and exact description of the same, reference being made to the accompanying drawing, forming a part of this specification, and in which—

Figure 1 is a longitudinal vertical section of my improved apparatus. Fig. 2 is a plan or top view through the line $x\ x$ of Fig. 1. Fig. 3 is a transverse section through the line $y\ y$ of Fig. 1.

This invention relates to certain improvements in apparatus for desiccating vegetables, fruit, grain, and other like materials; and the invention consists in the general construction and arrangement of parts, as will be hereinafter fully described, and pointed out in the claims.

In the drawing, A represents a chamber, provided with a stove, furnace, or other heating device, B. Said chamber is also provided with suitable openings $a$, communicating with the open air, for supplying fresh air to the apparatus. Above the chamber A is a horizontal chamber, C, one end being supported by said chamber, and the other end by legs $c\ c$. The chamber A communicates with chamber C, and as the air becomes heated in chamber A it will pass upward into the chamber C by reason of its lighter specific gravity, fresh air entering through openings $a$ to supply its place. D D are screens for the reception of the material to be dried, and are inserted through the doors E E, and supported upon side rails F. G and H represent doors for closing the chambers during the operation of the apparatus.

I is a pipe connecting with the heating device, and through which the products of combustion may escape. This pipe extends longitudinally through chambers C, and directly under the screens that contain the material to be dried, and passes into and up through the vertical exhaust-shaft J, said shaft J communicating near the bottom thereof with chamber C, and serving to exhaust the foul air as it collects in said chamber. K is an exhaust-pipe, communicating from the top of chamber C with the exhaust-shaft J, and which draws off the steam arising from the fruit or other material to be dried, and it is provided with a slide or cut-off, $d$, whereby I am enabled to keep the flavor of the material being dried in the drier as long as desired, and also evaporate at the top or bottom of the chamber C.

By passing the pipe I from the heating device longitudinally through the chamber C, I am enabled to get all the heat from the heating device to act upon the material being dried, there being sufficient heat, however, remaining to rarefy the damp air that may collect in the bottom of the drying-chamber.

I claim as my invention—

1. The combination, with the drying-chamber C, having the heating device B and the doors, as shown, of the independent exhaust-shaft J, arranged outside of the drier, and the inclined exhaust-pipe K, provided with slide or cut-off $d$, the several parts constructed and relatively arranged in the manner herein shown and described.

2. The combination, with the chamber A, heating device B, chamber C, exhaust-pipe K, and exhaust-shaft J, of the flue or pipe I, extending longitudinally through the chamber C, and vertically through exhaust-shaft J, substantially as herein shown and described.

JOHN R. DODGE, JR.

Witnesses:
 THOS. SLADE,
 JOHN MOORE.